H. L. HERVEY.
Surveying Instrument.
No. 15,040.
Patented June 3, 1856.
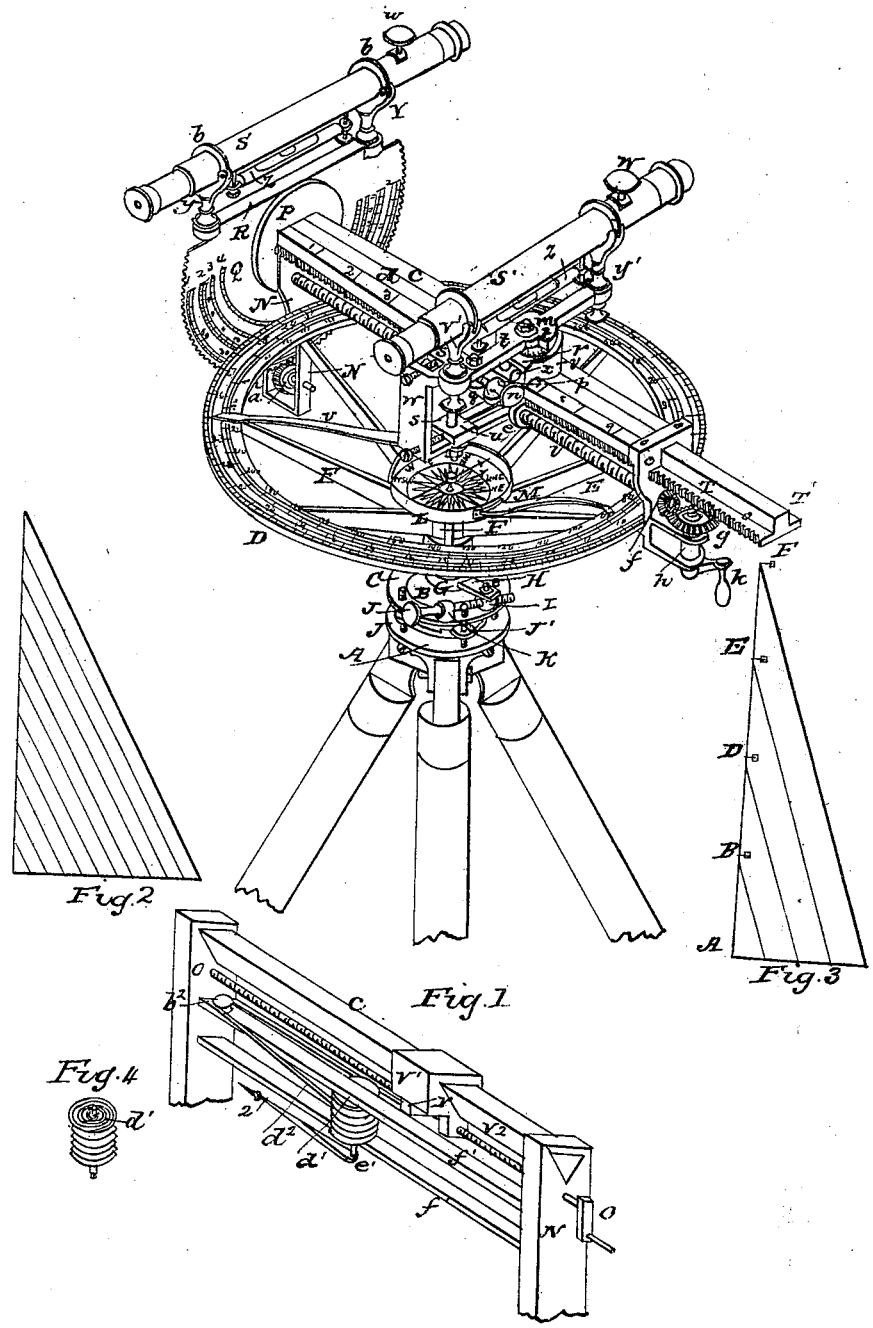

UNITED STATES PATENT OFFICE.

HORACE L. HERVEY, OF QUINCY, ILLINOIS.

PARALLACTIC INSTRUMENT FOR MEASURING DISTANCES.

Specification of Letters Patent No. 15,040, dated June 3, 1856.

*To all whom it may concern:*

Be it known that I, HORACE L. HERVEY, of the city of Quincy, county of Adams, and State of Illinois, have invented a new and useful Machine for the Purpose of Surveying and Measuring Distances; and I do hereby declare that the following is a full and exact description of the same, reference being had to the accompanying drawings and to the letters of reference thereon.

Drawing I, is a perspective view of the instrument; Drawing II, section of proposed plan Figure 1. Figs. 2 and 3 are views of the plan of operating the instrument.

The nature of my invention consists in a telescope or sighting apparatus with bars arranged at a right angle or nearly so to it in combination with a second telescope or sighting apparatus arranged to traverse on said bars and provided with devices to determine the distance. The second telescope is traversed on said bar and the relative angle at which it stands to the first telescope is indicated and registers the distance of objects sighted to in the intersections of the courses sighted by the first mentioned telescope.

In the accompanying drawings A is a circular plate provided with a female screw, by which it is affixed to the top of the tripod. Upon the top of the plate A there is a hollow projection terminating in a hemisphere which is covered by the hemispherical projection, B, on the plate C, which screws onto the spindle of a hemispherical ball fitted to the projection in the plate A so as to form a ball and socket joint similar to those in common use in leveling and other surveying instruments.

The horizontal dial D consists of a graduated circle supported by the arms, E, E, which terminate in the hub F which hub is provided with a pivot fitted to turn freely in the spindle that the plate C screws into. The pivot of the hub F is provided with a clamp G which is tightened by a screw opposite to the arm H; which arm H, is provided with a screw nut I to which the tangent screw J, is fitted which turns in the stud K, fastened in the plate C; so as to adjust the dial D very minutely, and the plate C is perforated by four leveling screws J', J', which act against the top of the plate A, and are turned to level or adjust the dial D, as desired. The compass L, is fitted to turn on a pivot fastened to the hub F, of the dial D. The dial of the compass may be turned by the index M, which is fastened to it and points to the inner graduated circle on the dial D, which is divided into three hundred and sixty degrees or spaces which may be subdivided in the usual manner or otherwise.

There are two brackets N, and O, fastened to the dial D, opposite to each other; the bracket N, supports the plate P, which is fastened to it, which plate is provided with a hub to which the hub of the vertical dial Q is fitted so as to turn freely on it. This vertical dial consists of little more than half a circle with teeth on its circular edge which are acted upon by the pinion $a$ turned by the head $a'$ so as to adjust the dial very minutely, the axis of the pinion $a$ being fitted to turn in the lower arm of the bracket N, as represented in the drawing. The bar R is fastened to the upper edge of the vertical dial Q and it has the wyes Y, Y, fastened into it which supports the telescope S, to which they are fitted and are provided with loops $b$, $b$, to secure the telescope in its place in the usual manner. There are two bars $c$, $c$, fastened to the hub of the plate P, which bars extend across over the dial D, and have their ends fastened to the bracket $o$, as represented in the drawing.

The bar T is made in the form represented and provided with a rib $d$, which is fitted to traverse between the bars $c$, $c$, when it is operated by the screw U, which turns in the nut $e$, fastened to the underside of the bar T for that purpose; the journals of the screw U, being fitted to turn in the brackets N, and O, and one of the journals extends through the bracket O, and has the bevel pinion $f$, fastened to it, which is acted upon by the gear $g$, on the shaft $h$, which is fitted to the lower arms of the bracket O, and is provided with a crank $k$, by which it may be turned to operate the screw U, and traverse the bar T. The block V, is fastened to the bar T, so as to traverse with it and carry the bar $l$, which is fitted to turn on the pivot $m$ of the block V. The bar $l$, has the wyes Y', Y', fastened into it which are arranged to hold the telescope S', in the same way that the wyes Y, Y, hold the telescope S, as heretofore described. The tangent screw $n$, is fitted to the stand $p$, on the block V, and turns in the nut $q$ fastened to the bar $l$, to adjust the bar and telescope to the angle desired, which will be indicated upon the dial $r$, on the block V, by the projection $t$, on the bar $l$, which serves as an index to denote the angle at which the telescope S', stands or may be placed. The bracket W, is fastened to the bars $c$, $c$, which bracket supports the boxes $s$, $s$, in which the vertical shaft $u$, turns and carries the index hand $v$, pointing to the outer circle of divisions on the dial D. The teeth $o$, $o$, on the edge of bar T form a rack which acts upon pinion on the shaft $u$, and turns the index hand $v$, when the bar T, and telescope S', are traversed so that the distance they are moved will be indicated by the index hand $v$, on the dial D.

The outer circle on the dial D, is divided into forty parts or rods. Each of these divisions is subdivided into sixteen and one half parts for feet, and those spaces subdivided into twelve spaces for inches, and there may be a series of circles on this dial arranged within each other and divided and subdivided to suit the different kinds of measuring for which the instrument may be used. There are four semicircles or divisions represented on the vertical dial Q. In the drawing the first or outer one is divided into one hunded and eighty parts, or degrees, or from zero each way ninety degrees. The second scale or circle is divided into twelve parts or six each way, from zero each part divided into ten parts, and each of these parts subdivided into ten more parts to indicate the elevation or depression of the telescope S. In every four hundred feet if this scale is laid out for a greater distance than this the divisions must be increased but if laid out for a shorter distance then the spaces to be decreased. The third and fourth scales or circles are similar to the scale upon the vertical limb of a theodolite for the purpose of determining the difference between the hypotenuse and base lines. There may be as many semicircles of divisions on this dial as may be necessary or desirable and they may be divided and subdivided to suit the different purposes for which the instrument is to be used.

The level $x$ on the block V, and the levels $z$, $z$, on the telescopes S, S', indicate when the instrument is properly adjusted or arranged for service. The telescopes S and S', are made similar to the telescopes in common use in theodolites, and provided with thumb screws $w$, $w$, to adjust the glasses or lens, and they are also provided with the usual spider lines and devices for adjusting the same in the usual manner. One fourth of the circle on the dial $v$, is divided into nine parts and each part is subdivided into ten parts so as to show the angle or change of position of the telescope S', when it is adjusted or moved by the tangent screw $n$.

I contemplate that some of the parts or details in the construction of my instrument or invention may be varied in several ways which will readily suggest themselves to persons experienced in the art to which it appertains without departing from the principles or merits of my invention and that instead of the bars $c$, $c$, heretofore described a triangular bar $c$, Fig. 1, drawing II, may be used with brackets N and O fastened to it and the block V' fitted to traverse upon it and moved by the screw $V^2$ to carry the telescope S', and its appurtenances. Also that instead of the rack and pinion to move the index hand $v$, a chain or cord $a^2$ may be fastened to the block V' and pass around the pulley $b^2$ and fastened to, and wound around the cylinder $d'$, fastened to the shaft $e'$, fitted to turn in the base $f$, $f'$, and carry the index hand $v$, fastened to it, with a coiled spring arranged inside of the cylinder $d'$ to wind up the cord or chain $a^2$ when the block V' is traversed in one direction, and allow it to unwind when it is traversed in the other, and communicate the required motion to the index hand $v$.

The above described instrument or surveyor having been constructed and completed as above described and placed upon a tripod at A in the diagram Fig. 3, and the distance of twenty rods measured from the instrument to B, and a target set up to sight at, the instrument and telescope S' are elevated or depressed so as to adjust the latter to the target B. The instrument is now turned so as to adjust the telescope S, to the target B, and clamped so as to hold it firmly in that position by the clamp G. The bar T, is traversed so that the index hand $v$ will point to the twentieth division on the outer circle of the dial D. The telescope S' is now vibrated by the tangent screw $n$, until it sights the target B, when the instrument will be set for further service. For instance if the telescope S' is moved so that the index hand $v$, will point to the thirtieth division on the dial D, the telescopes S and S', will both sight the target D thirty rods distant from A. If the telescope S', is traversed so that the index $v$ points to the fortieth division on the dial D, the telescopes will both sight the target E forty rods distant from A, and if the telescope S' is traversed so as to sight the target F fifty rods distant, then the block V will have passed over one space on the bar $c$, $c$, drawing I, and the index hand $v$, will have made one complete revolution and will stand at ten on the dial D, and in the same way any intermediate distance may be determined, as it will be denoted on the dial D, by the index hand $v$ which registers the distance correctly on dial D.

In using the compass L, I first set the index hand M over zero on the dial D when